United States Patent

Fischer

[11] Patent Number: 5,919,019
[45] Date of Patent: Jul. 6, 1999

[54] MID-PANEL NUT

[75] Inventor: John D. Fischer, Whitmore Lake, Mich.

[73] Assignee: California Industrial Products, Inc., Santa Fe Springs, Calif.

[21] Appl. No.: 09/009,348

[22] Filed: Jan. 20, 1998

[51] Int. Cl.[6] ............................ F16B 37/04; F16B 39/284
[52] U.S. Cl. .......................... 411/182; 411/112; 411/177
[58] Field of Search ........................... 411/111, 112, 113, 411/174, 175, 173, 177, 182, 55

[56] References Cited

U.S. PATENT DOCUMENTS

| | | | |
|---|---|---|---|
| 4,595,325 | 6/1986 | Moran et al. | 411/182 X |
| 4,610,588 | 9/1986 | Van Buren, Jr. et al. | 411/173 |
| 4,897,005 | 1/1990 | Peterson et al. | 411/112 X |
| 5,306,091 | 4/1994 | Zaydel et al. | 411/112 X |

*Primary Examiner*—Neill Wilson
*Attorney, Agent, or Firm*—George J. Netter

[57] ABSTRACT

A nut (10) for mounting into an opening (18) located in the central part of a panel (14) includes a sleeve (16) and resilient locking trips (44,46) and panel edge securing means 948) extending from opposite sides of the nut. When the nut is positioned within the opening (18) the locking strips (44,46) obstruct removal from the opening. On a bolt (62) being fully received within the sleeve (16) both the strips and edge securing means (48) contactingly engage the panel (14).

11 Claims, 2 Drawing Sheets

MID-PANEL NUT

BACKGROUND

1. Background of the Invention

The present invention relates generally to a self-locking panel nut fastener and, more particularly, to such a nut for being received within an opening in the more central regions of a panel which self-locks and upon receiving a threaded screw or bolt enhances the locking relationship with the panel.

2. Description of Related Art

There are many situations in which panels have openings located inwardly of the edges to which it would be desirable to adhere other equipment or panels. A desirable means for accomplishing this would be the provision of a nut which could be readily positioned within the opening and self-lock on receiving a securing bolt or screw therein. This is especially desirable in those situations in which access is substantially confined to one side of the panel and where there is no easy means of tightening or otherwise securing or adjusting the nut position from the opposite side of the panel. These situations are frequently encountered in modern automotive vehicles and the nut to be described is especially advantageous for use in that context.

SUMMARY OF THE INVENTION

The fastener nut is constructed from a blank or strip of sheet metal stamped and formed into final configuration. A central part of the fastener includes a sleeve extending from a surface thereof and which is provided with one or more internal threads for accommodating a screw or bolt therein. Wing-like side portions are arranged at two opposite sides of the threaded sleeve and extend in a common direction so as to pass through the opening in a panel during mounting use. Each of the wing portions includes first locking parts which snap into place on the far side of the panel when the nut is mounted thereto and by virtue of inherent spring characteristic of the sheet metal automatically spring outwardly to lockingly obstruct removal of the nut from the opening. Further locking portions directly engage the edge of the panel opening for frictionally resisting removal of the nut once it is mounted within the opening as well as insuring locking retention and preventing transverse movement of the nut within the opening.

BRIEF DESCRIPTION OF THE DRAWINGS

The ensuing detailed description of the invention can be more readily appreciated and understood by reference to the accompanying drawing in which there are provided t following figures.

DESCRIPTION OF A PREFERRED EMBODIMENT

Figure 5:
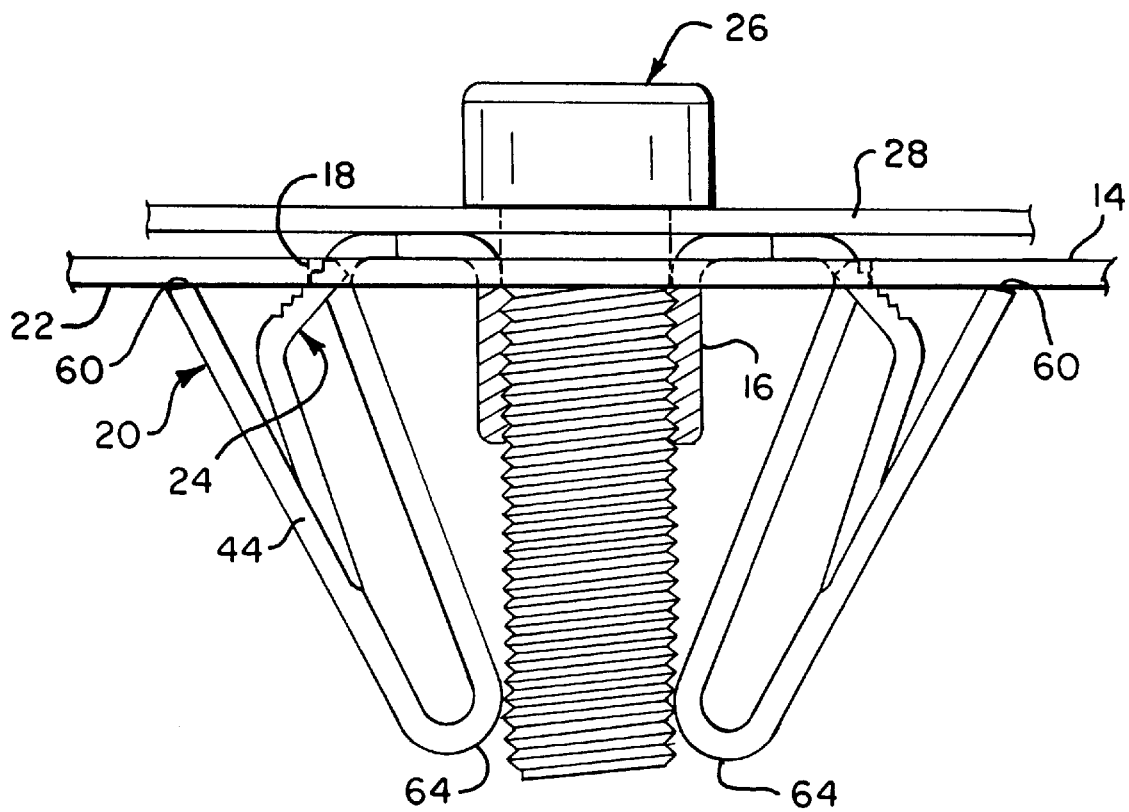
FIG. 5 is a side elevation of the nut shown mounted in a panel opening.

For the ensuing description reference is now made to the drawings and especially FIG. 1 where the nut of the invention is enumerated generally as 10 and includes in its major parts a base plate 12 which abuts against a major surface of a panel 14 in a way that will be described when a sleeve 16 integral with the base plate is fully extended through a panel opening 18. When so mounted, at opposite sides of the nut there are provided first locking means 20 which automatically extend to a position opposite the lower major surface 22 of the panel to which the nut is affixed and also second locking means 24 which frictionally contact the panel opening 18 edges (FIG. 5).

As will be more particularly described, the combined action of the locking means 20 and 24 serve to fully secure the nut within opening 18 of the panel enabling receipt of a threaded bolt 26 therewithin and securing other apparatus to the panel which other apparatus is more generally shown and enumerated as 28.

Figure 4:
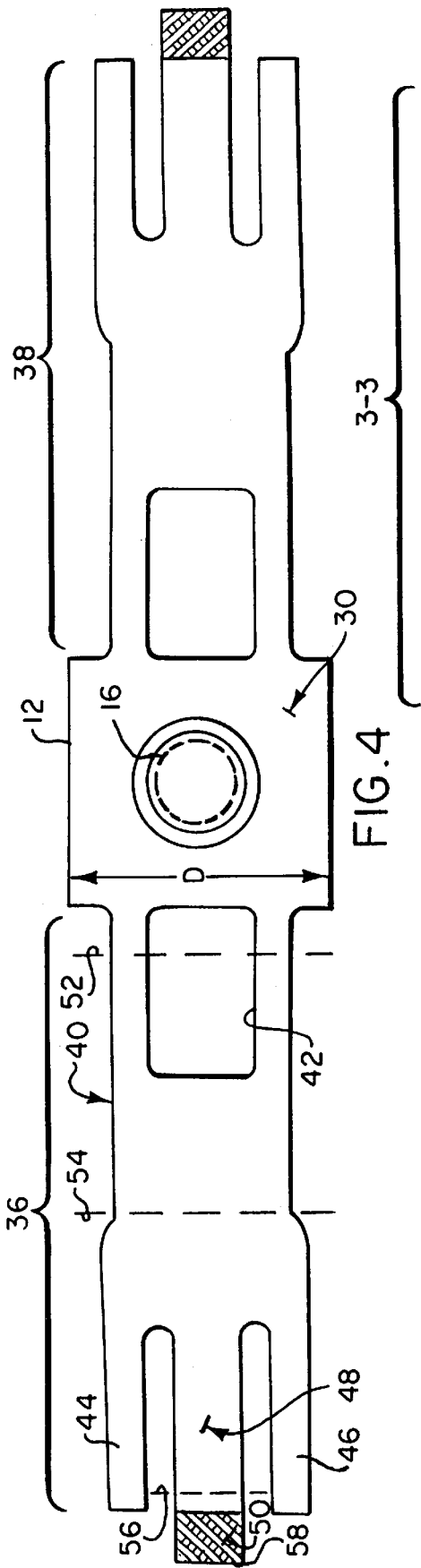
FIG. 4 is a p plan view of a metal blank from which the nut of is invention is made.

With reference now particularly to FIG. 4 there is shown an overall generally rectangular blank 30 made of sheet metal (e.g., steel) from which the nut 10 of this invention is formed. In its major parts, the blank includes a central generally rectangular base plate (identical to base plate 12) having an edge dimension D which exceeds the width of panel opening 18 and in that way will prevent the nut from passing completely through the opening 18. A sleeve 16, either drawn or roll-formed, is provided in upstanding relation in the central region of the base plate and includes one or more internal threads. First and second identical sets of sidewall members 36 and 38 extend from opposite sides of the base 12 in opposite directions from one another and generally at 90 degrees to the base sidewall.

Only the sidewall members 36 will be described in detail since the sidewall members 38 have corresponding component parts constructed in the same manner. More particularly, the sidewall member 36 includes a generally rectangular extension 40 with an included opening 42 formed at the adjacent edge of the base plate, which opening primarily serves to reduce spring resistance in that region and in that way reduce nut installation force. Outwardly of the opening 42 the extension 40 includes first and second generally rectangular, elongated, locking strips 44 and 46 in spaced apart and generally parallel relation. The two sets of locking strips collectively form the first locking means 20.

Intermediate the two locking strips 44 and 46 there is provided a panel edge securing means 48 which is substantially rectangular and extends generally parallel to the adjacent locking strips. After initial forming, the outer end portion 50 of the panel edge securing means 48 is provided with a good frictional surface such as, for example, by knurling.

The dotted lines 52, 54 and 56 on the blank 30 are bend lines for forming the blank component parts into the desired shape of the nut 10.

Preferably the blank 30 is formed to desired shape by a conventional press or stamping process. Also, in all forming steps to be discussed, the bend lines should be sufficiently radiused so as not to weaken the resulting nut construction by the inclusion of sharp corners.

As a first step in the formation of the nut 10, the blank is treated preferably by a set of conventional progressive dies (not shown) which successively apply pressure to the blank metal for drawing or roll-forming the sleeve 16 and then accomplish internal threading of the sleeve.

Figure 3:
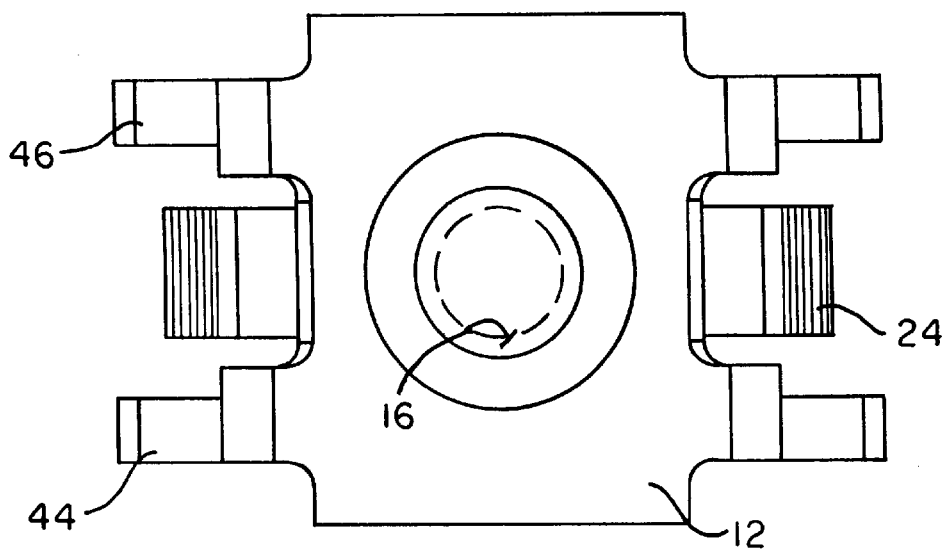
FIG. 3 is a top plan view taken along line 3—3 of FIG. 1.

Following the sleeve formation, the panel edge securing means 48 have their outer end portions 50 on the major surface facing in the same direction that the sleeve extends treated to provide a scored surface with relatively sharp ridges facing outwardly from the metal surface for biting into the panel opening inner edge during use. Preferably, the ridges extend at an angle that will provide a good gripping engagement with the inner edges of panel opening 18 (e.g., generally parallel to opening edges as in FIG. 3, or at an angle differing from 90 degree engagement with opening edges as in FIG. 1).

Figure 1:
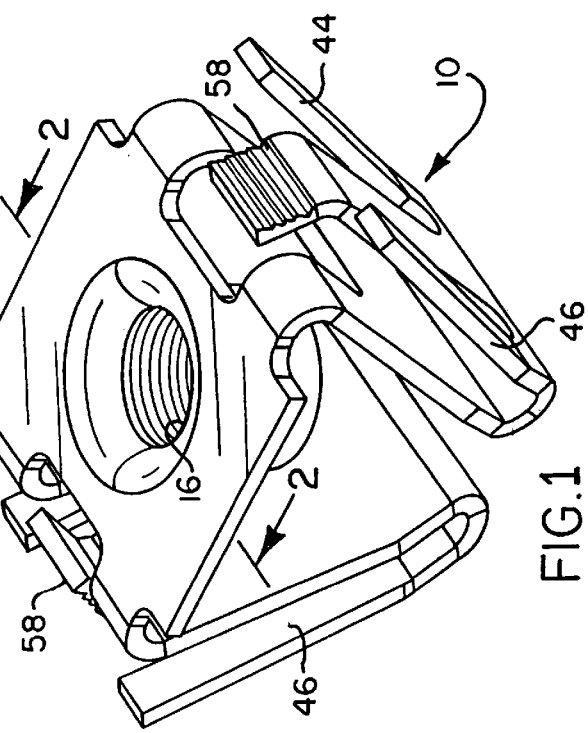
FIG. 1 is an isometric view of the nut of the present invention shown in unstressed condition prior to being mounted in panel opening.
Figure 2:
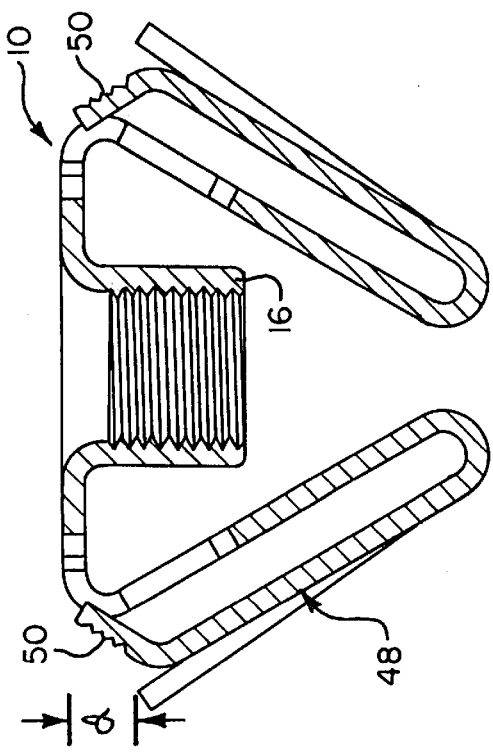
FIG. 2 a side elevational, sectional view taken along the line 2—2 of FIG. 1.

Finally, the strips 44 and 46 and the means 48 are bent along the bend lines 52–56 in order to provide the final arrangement as shown in FIGS. 1 and 2, for example. More particularly, in final formed condition, the two extensions 40 are bent about the respective lines 52 so as to extend angularly toward each other with the further bend line 54 lying within the projected cross sectional area of the sleeve bore (FIG. 2). Also, strips 44, 46 and means 48 are bent about line 54 so as to be outward of the respectively adjacent extension 40 and generally parallel thereto. Still further, the outer end portion 50 is bent about line 52 toward the extension 40 so the tip 58 of means 48 is just within the opening 42 (FIG. 1).

In use, the nut 10 is received within the generally rectangular opening 18 in the panel 14 which is appropriately dimensioned for sliding receipt of the nut therein. When the forward portions of the locking strips 44 and 46 pass through the opening 18 the strips are laterally compressed slightly and so dimensioned that as the strip ends 60 extend completely through the opening, they spring laterally outwardly behind the panel edges now preventing withdrawal of the nut therefrom.

It is also important to note that in final form that the means 48 are positioned inwardly of strips 44 and 46 (FIG. 2) sufficiently so that when the nut is inserted in the panel opening the means 48 pass through the opening with at most only slight compression. At this time the specially prepared frictional end portions 50 of the means 48 are located in slightly spaced or barely contacting relation with the edge portions of the panel opening. Accordingly, installation force of the nut into the panel opening is determined substantially solely by the spring reaction caused by the strips 44 and 46 as they pass through the panel opening.

On a bolt 62 being threaded into the nut sleeve as shown in FIG. 5 and outwardly of the threaded sleeve, it engages the bend-line locking strip ends 64 and separates them. By this action, the scored regions 50 of the panel securing means 48 engage the inner edges of the panel opening 18 which not only increases the locking force against withdrawal of the nut from the opening, but also secures the nut against lateral movement within the opening.

Although the invention has been described in the preferred embodiment as having a threaded sleeve for receiving a similarly threaded bolt 62, it is contemplated that the invention can be advantageously employed with other fastening arrangements, such as caged or so-called clinch nuts.

As shown in FIG. 5 the tips 60 of strips 44 and 46 contact the lower surface of panel 24 when bolt 62 is fully received within the nut. The spacing d (FIG.) between tips 60 and the base plate 12 is made so as to enable accommodating a range of panel thicknesses as opposed to a single precise thickness, for example.

More particularly, when the nut of the invention is mounted into a panel opening, it is not only prevented from being withdrawn from the opening without special tooling, but also provides a firm and reliable positioning of the nut within the opening which is desirable and promotes ease of mounting of a bolt with associated apparatus to the nut.

Although the present invention has been described in connection with a preferred embodiment, it is to be understood that those skilled in the art may provide modifications which come within the spirit of the invention as described and within the ambit of the appended claims.

What is claimed is:

1. A nut for locking receipt within a panel opening formed from a sheetlike metal blank, comprising a base plate;

a sleeve unitary with and upstanding from a major surface of the base plate;

first and second extensions integral with the baseplate and respectively extending away from each of two opposite sides of the base plate;

first and second spaced apart locking strips respectively integral with the first and second extensions and extending away from each of two opposite side edges of said extensions at an acute angle toward the sleeve central axis; and first and second securing means unitarily located respectively to said first and second extensions between the first and second locking strips of each, each said securing means including a high-friction end portion facing generally away from the sleeve.

2. A nut as in claim 1, in which the high-friction end portions include more than one raised ridge.

3. A nut as in claim 2, in which the raised ridges are generally parallel to the panel opening inner edge.

4. A nut as in claim 2, in which the raised ridges extend across the panel opening inner edge at an angle other than 90 degrees.

5. A nut as in claim 1, in which the locking strips and securing means are so dimensioned that on mounting the same through a first side of the panel opening the locking strips contact the panel adjacent the second side of the panel opening throughout stress and unstressed use of said nut.

6. A fastener system for mounting an object to a panel opening solely from a first side of the panel, comprising:

a nut including, a base plate having edges and dimensioned to prevent passage through the panel opening, a sleeve on said base plate, first and second extensions integral with the base plate and respectively extending away from each of two opposite edges of the base plate;

first and second locking means respectively extending outwardly from opposite sides of the first and second extensions, said locking means having springlike characteristics and are of such dimensions as to be compressed while passing through the panel opening and after passing through the opening expand outwardly to obstructingly contact an opposite side of the panel, first and second securing means of springlike characteristics respectively extending outwardly from the same two opposite sides of the base plate as the locking means, each such means having biting end portions; and a bolt-like member received in the sleeve and having a head portion to affix the object to the nut and panel, at which time an end portion of the member contacts the securing means moving the biting end portions against opposite panel opening sidewall edges preventing relative transverse movement of the nut within the panel opening.

7. A fastener system as in claim 6, in which the boltlike member and sleeve form a clinch nut.

8. A fastener system as in claim 6, in which the sleeve and boltlike member are threaded.

9. A fastener system as in claim 6, in which the locking means are so-dimensioned that outer tips of said locking means are spaced from the base plate an amount sufficient to enable mounting of the fastener system to panels over a range of thickness.

10. A fastener system as in claim 8, in which the biting end portions extend generally parallel to the panel opening inner edge when the member is fully received within the sleeve.

11. A fastener system as in claim 6, in which the biting end portions include raised ridge portions that extend across the panel opening inner edge at an angle other than 90 degrees.

* * * * *